United States Patent [19]

Schoos et al.

[11] Patent Number: 6,142,513
[45] Date of Patent: *Nov. 7, 2000

[54] PROCESS FOR CONTROLLING THE OPERATION OF A MOTOR VEHICLE AIRBAG

[75] Inventors: Aloyse Schoos, Bertrange, Luxembourg; Thomas Schleeh, Berlin, Germany

[73] Assignee: I.E.E. International Electronics and Engineering S.A.R.L., Luxembourg

[ * ] Notice: This patent issued on a continued prosecution application filed under 37 CFR 1.53(d), and is subject to the twenty year patent term provisions of 35 U.S.C. 154(a)(2).

[21] Appl. No.: 09/011,435

[22] PCT Filed: Aug. 5, 1996

[86] PCT No.: PCT/EP96/03449

§ 371 Date: Jun. 16, 1998

§ 102(e) Date: Jun. 16, 1998

[87] PCT Pub. No.: WO97/06990

PCT Pub. Date: Feb. 27, 1997

[30] Foreign Application Priority Data

Aug. 17, 1995 [LU] Luxembourg ................ 88647

[51] Int. Cl.⁷ ............... B60R 21/18; B60R 21/32
[52] U.S. Cl. ................. 280/735; 280/733
[58] Field of Search ................ 280/735, 734, 280/733

[56] References Cited

U.S. PATENT DOCUMENTS

| | | | |
|---|---|---|---|
| 3,748,639 | 7/1973 | Dobedoe et al. | 340/52 E |
| 5,118,134 | 6/1992 | Mattes et al. | 280/735 |
| 5,330,226 | 7/1994 | Gentry et al. | 280/735 |
| 5,515,933 | 5/1996 | Meyer et al. | 280/735 |
| 5,549,323 | 8/1996 | Davis | 280/735 |
| 5,626,359 | 5/1997 | Steffens, Jr. et al. | 280/735 |
| 5,653,462 | 8/1997 | Breed et al. | 280/735 |
| 5,683,103 | 11/1997 | Blackburn et al. | 280/735 |
| 5,722,686 | 3/1998 | Blackburn et al. | 280/735 |
| 5,829,782 | 11/1998 | Breed et al. | 280/735 |
| 5,848,802 | 12/1998 | Breed et al. | 280/735 |
| 5,871,232 | 2/1999 | White | 280/735 |

FOREIGN PATENT DOCUMENTS

| | | |
|---|---|---|
| 0 357 225 A1 | 3/1990 | European Pat. Off. . |
| 0 650 869 A1 | 5/1995 | European Pat. Off. . |
| 2 236 419 | 4/1991 | United Kingdom . |
| WO 94/22693 | 10/1994 | WIPO . |

OTHER PUBLICATIONS

Research Disclosure, (1994) Jan., No. 357, Emsworth, GB.

Research Disclosure, (1994) Feb., No. 358, Emsworth, GB.

*Primary Examiner*—Lanna Mai
*Assistant Examiner*—Jeffrey J. Restifo
*Attorney, Agent, or Firm*—Leydig, Voit & Mayer

[57] ABSTRACT

The process comprises the determination of the position, particularly the distance between a passenger or driver and the deployment center of the respective airbag and controlling the deactivation of said airbag or a modulation of its deployment as a function of said position or said distance in order to avoid or reduce the risks of accidents due to the inflation of the airbag when the passenger occupies an abnormal position.

5 Claims, No Drawings

PROCESS FOR CONTROLLING THE OPERATION OF A MOTOR VEHICLE AIRBAG

FIELD OF THE INVENTION

The present invention relates to a method for controlling the operation of an airbag in a motor vehicle, and more especially of an airbag which is associated with a control module.

BACKGROUND OF THE INVENTION

The growing increase in the number of items of airbag equipment fitted in vehicles has allowed a great deal of information to be gathered regarding the operation of airbags, and this has made a great contribution to improving them. One of these improvements consists in subjecting the operation of the airbag to an intelligent control unit which is fed by various detectors so as to adapt the deployment of the airbag to certain circumstances.

Thus, for example, document DE-4237072 proposes a system for detecting whether the passenger seat is occupied so as to disable this airbag when this seat is not occupied in order not to have to replace the airbag when the vehicle is repairable after an impact which has triggered the deployment of the airbag.

Documents LU-88 547 and 88 588 propose a system for detecting whether the passenger seat is occupied by an auxiliary child seat and for detecting the orientation of this auxiliary seat in order to disable the airbag when this seat is facing in the rearwards direction, in order to prevent a child from being thrown violently towards the rear of the vehicle under the effect of the deployment of the airbag.

What is more, new gas generators are on the drawing board so that in the future it will be possible to have a multi-level operation and a gradual and more subtle than all or nothing deployment, especially in order to take account of the inertial mass of the passenger, which can be obtained from the information supplied consists of a pressure sensor of the FSR type.

It has also been observed that the deployment of an airbag can be very dangerous for a passenger when this passenger is occupying a position other than his so-called normal position. It should be realized that an airbag deploys in the form of a mushroom with a sudden longitudinal spurt followed by lateral inflation. Now, if the passenger's head, for example, when the passenger is looking for something in the storage binnacle, is too close to the airbag cassette, and therefore in the field of deployment of the airbag, particularly in the path of the initial spurt, the effect of the airbag may be more harmful than beneficial.

This is why a method for controlling the deployment of an airbag as a function of the position of the seat occupant has already been proposed. Document GB-A-2,236,419 describes such a method. The occupant's position is determined by telemetry measurements based either on the occupant's body cutting a beam or by the journey time for a wave reflected off the occupant.

Document WO-A-94/22693 also describes a method of this kind which employs radar waves to reconstruct an image of the occupant.

These measurements, based on reflection, may, however, be made false by an object that the occupant is holding in his hands, for example a book or a newspaper.

Methods based on reflection off marks provided on the seatbelt are also known. Such methods are known from Research Disclosure, 1994, January, No. 357, Emsworth GB, p. 50 or from U.S. Pat. No. 3,748,639. These methods are used to check whether the seatbelt is being worn or to determine how far it is unwound.

SUMMARY OF THE INVENTION

The object of the present invention is to provide a method for controlling the operation of the airbag which makes it possible to eliminate, or at least reduce, the risks of accidents due to a deployment of an airbag when the passenger behind the airbag is occupying an abnormal position.

DETAILED DESCRIPTION OF THE PREFERRED EMBODIMENTS

In order to achieve this objective, the invention proposes a method for controlling the operation of an airbag in a motor vehicle, consisting in determining the position of an occupant, particularly his distance from the centre of deployment of the airbag(s) associated with his seat and in disabling this or these airbag(s) or altering its (their) deployment(s) as a function of this position, characterized in that at least one electromagnetic-field emitter and at least one electromagnetic-field receiver are provided, in that these emitter(s) and receiver(s) are arranged in such a way that the electromagnetic field is modified by a movement of the occupant thanks to one or more appropriate marking(s) provided on the seatbelt and in that the position of the occupant is determined as a function of the influence that his position has on the electromagnetic field between the emitter (s) and receiver(s).

Based on the fact that the seatbelt has necessarily always to follow any forwards movement of the passenger, it is possible to provide on the seatbelt marks or markings which are capable of being detected, of detecting, of influencing or of emitting radiation.

It is, for example, possible to provide on the seatbelt an autonomous and passive, that is to say unpowered, electromagnetic marking in the form of a resonator or of a resonating loop which is excited by an electromagnetic field created by at least one inductive structure. This or these inductive structure(s) may be provided on or close to the airbag cassette, or behind the passenger in the back of the seat.

It is, however, preferable to provide these inductive structures both in front of the passenger and behind him so that they will create an electromagnetic field alternately and thus allow additional measurements.

These inductive structures in front of and/or behind the passenger may also be supplemented by at least one inductive structure provided in the roof of the vehicle.

Associated with each excitation inductive structure is a receiving inductive structure. The marking in the form of an electromagnetic resonator influences the electromagnetic field in which it lies belonging to the excitation structure, and this influence can be identified by the receiving structure in a way similar to the detection system proposed in the patents LU-88547 and 88588.

If the resonator and therefore the electromagnetic excitation field is modified by a subcarrier which is synchronous with the excitation frequency, for example, with the aid of appropriate electronic circuitry associated with the resonator, then synchronous detection by the receiver allows a great deal of immunity with regard to any parasitic fields. The induction loops of the receiver detecting the resultant electromagnetic field, possibly modulated, are arranged in such a way that the signal received is inversely proportional to the distance between the inductive structures and the marking on the seatbelt. Electronic marking of this kind experiences very little disturbance and offers good detection reliability.

Aside from modulation using a subcarrier, it is possible to modulate the subcarrier using a code or identity information which will definitely eliminate any possibly parasitic fields which may arise, for example, from a transponder carried by the passenger and having nothing to do with the detection system.

It is also possible to use for the marking a modulation which is synchronized with the excitation frequency in combination with demodulation synchronized with the excitation frequency at the receiver.

It is also possible to use various levels of excitation of the emitting structure in turn in order to stimulate or not stimulate the marking on the belt as a function of its distance and thus obtain a response in accordance with the distance and as a function of the excitation power.

According to another alternative form, it is just as possible to provide on the seatbelt a non-autonomous marking, that is to say a conductive marking which is powered with DC or AC current through the belt. This marking then constitutes an emitting antenna, the signals from which are picked up by receiving structures or antennae provided close to the airbag cassette and/or in the back of the passenger seat and which measure the distance on the basis of the attenuation of the electromagnetic field as a function of the distance. Conversely, it is just as possible to provide the reception part on the belt and the emitting antenna at the cassette or in the back of the seat.

In the various methods described hereinabove, which are based on a marking on the belt, it is advantageous to provide a number of identical or similar markings on the belt. This offers a better guarantee of optimum communication between the markings on the one hand, and the emitters and receivers on the other hand, and reduces errors which may result from changes in position of the marking as a consequence of the belt being unwound to greater or lesser extents. Furthermore, risks of error that may be caused by poor operation of one marking are eliminated.

The various markings on the belt may moreover be differentiated by having different subcarriers and/or identification codes, and this will contribute to the measurements being more reliable.

It is also possible to combine or to associate several of the various measurement principles described hereinabove into one and the same airbag, and this will of course increase the reliability and the possibilities for interpreting the results.

The detection system recommended by the present invention is not limited to the front passenger airbag, but can also be applied to the driver's airbag and, as appropriate, to rear-passenger airbags.

What is claimed is:

1. A method for controlling the operation of at least one airbag in a motor vehicle, comprising determining the position of an occupant from the center of deployment of the at least one airbag associated with the seat of the occupant and altering the deployment as a function of the position of the occupant, characterized in that at least one electromagnetic-field emitter and at least one electromagnetic-field receiver are provided, each emitter and receiver are arranged in such a way that the electromagnetic field is modified by a movement of the occupant due to at least one conductive marking provided on the seatbelt and in that the position of the occupant is determined as a function of the influence that the position of the occupant has on the electromagnetic field between the at least one emitter and receiver.

2. Method according to claim 1 wherein the at least one conductive marking provided on the seatbelt is autonomous to act as resonator and interact with the at least one emitter and the at least one receiver, the at least one emitter and the at least one receiver being inductive structures arranged at respective fixed points in the motor vehicle.

3. The method of claim 1 wherein the step of altering the deployment comprises disabling the at least one airbag.

4. A method for controlling the operation of at least one airbag in a motor vehicle, comprising determining the position of an occupant from the center of deployment of the at least one airbag associated with the seat of the occupant and altering the deployment as a function of the position of the occupant, characterized in that at least one electromagnetic-field emitter and at least one electromagnetic-field receiver are provided, each emitter and receiver are arranged in such a way that the electromagnetic field is modified by a movement of the occupant in that the position of the occupant is determined as a function of the influence that the position of the occupant has on the electromagnetic field between the at least one emitter and receiver, wherein each emitter and each receiver are arranged separately on the seat belt and at a fixed point in the vehicle, whereby one of said emitter or receiver being fixed and the other being movable.

5. The method according to claim 4 further comprising at least one autonomous marking on the seatbelt to act as a resonator, each emitter and receiver being inductive structures arranged at fixed points within the motor vehicle.

* * * * *